(12) United States Patent
Hoscilowicz et al.

(10) Patent No.: US 12,444,402 B2
(45) Date of Patent: Oct. 14, 2025

(54) SPEECH RECOGNITION DEVICE AND OPERATING METHOD THEREOF

(71) Applicant: SAMSUNG ELECTRONICS CO., LTD., Suwon-si (KR)

(72) Inventors: Jakub Hoscilowicz, Warsaw (PL); Kornel Jankowski, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 17/847,469

(22) Filed: Jun. 23, 2022

(65) Prior Publication Data

US 2023/0115538 A1    Apr. 13, 2023

Related U.S. Application Data

(63) Continuation of application No. PCT/KR2022/008311, filed on Jun. 13, 2022.

(30) Foreign Application Priority Data

Sep. 24, 2021 (KR) .................... 10-2021-0126707

(51) Int. Cl.
*G10L 15/02* (2006.01)
*G06F 16/68* (2019.01)
(Continued)

(52) U.S. Cl.
CPC .............. *G10L 15/02* (2013.01); *G06F 16/68* (2019.01); *G10L 15/04* (2013.01); *G10L 15/08* (2013.01)

(58) Field of Classification Search
CPC ......... G10L 15/02; G10L 15/04; G10L 15/08; G10L 15/063; G10L 2015/025; G10L 15/10; G06F 16/68; G06F 40/295
See application file for complete search history.

(56) References Cited

U.S. PATENT DOCUMENTS 9,454,957 B1   9/2016  Mathias et al.
9,779,730 B2   10/2017 Hong et al.
(Continued)

FOREIGN PATENT DOCUMENTS

CN    111737979 A    10/2020
CN    112257422 A    1/2021
(Continued)

OTHER PUBLICATIONS

International Search Report (PCT/ISA/220 and PCT/ISA/210) and Written Opinion (PCT/ISA/237) issued Sep. 22, 2022 by the International Searching Authority in International Application No. PCT/KR2022/008311.

*Primary Examiner* — Daniel C Washburn
*Assistant Examiner* — Penny L Caudle
(74) *Attorney, Agent, or Firm* — Sughrue Mion, PLLC

(57) ABSTRACT

Provided are a method and device for speech recognition. The speech recognition method includes: receiving a speech signal generated by an utterance of a user; identifying a named entity from the received speech signal; determining a speech signal portion, which corresponds to the identified named entity, from the received speech signal; generating a first acoustic embedding vector corresponding to the speech signal portion, based on an acoustic embedding model; determining a second acoustic embedding vector that is one of a plurality of acoustic embedding vectors corresponding to a plurality of named entities included in an acoustic embedding database (DB), based on distances between the plurality of acoustic embedding vectors and the first acoustic embedding vector; determining a corrected named entity corresponding to the second acoustic embedding vector; and providing a result of speech recognition with respect to the speech signal, based on the corrected named entity.

14 Claims, 17 Drawing Sheets

(51) Int. Cl.
*G06F 40/295* (2020.01)
*G10L 15/04* (2013.01)
*G10L 15/08* (2006.01)

(56) References Cited

U.S. PATENT DOCUMENTS

| | | | |
|---|---|---|---|
| 9,922,025 B2 | 3/2018 | Cross, III et al. | |
| 10,055,489 B2 | 8/2018 | Haviv et al. | |
| 10,073,887 B2 | 9/2018 | Chehreghani | |
| 10,255,907 B2 * | 4/2019 | Nallasamy | G10L 15/063 |
| 10,672,391 B2 | 6/2020 | Maergner et al. | |
| 10,839,159 B2 | 11/2020 | Yang et al. | |
| 11,232,785 B2 | 1/2022 | Seo et al. | |
| 11,410,642 B2 | 8/2022 | Scuderi et al. | |
| 2009/0077122 A1 * | 3/2009 | Fume | G06F 16/3322 |
| 2016/0027437 A1 | 1/2016 | Hong et al. | |
| 2017/0084267 A1 * | 3/2017 | Shin | G10L 15/30 |
| 2019/0377747 A1 | 12/2019 | Fan et al. | |
| 2020/0020327 A1 | 1/2020 | Chae et al. | |
| 2021/0216722 A1 | 7/2021 | Dai et al. | |
| 2022/0129632 A1 | 4/2022 | Wei et al. | |

FOREIGN PATENT DOCUMENTS

| | | | | |
|---|---|---|---|---|
| CN | 112836513 A | | 5/2021 | |
| CN | 111798840 B | * | 8/2023 | G10L 15/02 |
| KR | 10-2018-0062003 A | | 6/2018 | |
| KR | 10-2019-0083629 A | | 7/2019 | |
| KR | 10-2019-0098928 A | | 8/2019 | |
| KR | 10-2021-0001937 A | | 1/2021 | |
| KR | 10-2332729 B1 | | 11/2021 | |
| WO | 2016/048350 A1 | | 3/2016 | |
| WO | WO-2020069051 A1 | * | 4/2020 | G06F 16/215 |
| WO | WO-2020256749 A1 | * | 12/2020 | G06F 40/295 |

* cited by examiner

SPEECH RECOGNITION DEVICE AND OPERATING METHOD THEREOF

CROSS-REFERENCE TO RELATED APPLICATION(S)

This application is a by-pass continuation of International Application No. PCT/KR2022/008311, filed on Jun. 13, 2022, filed in the Korean Intellectual Property Receiving Office, which is based on and claims priority to Korean Patent Application No. 10-2021-0126707 filed on Sep. 24, 2021, the disclosures of which are incorporated herein by reference in their entireties.

TECHNICAL FIELD

Various embodiments of the disclosure relate to a device and a method for performing speech recognition, and more particularly, to a device and a method for more accurately determining the meaning of a user's utterance based on a speech of the user.

BACKGROUND ART

Recently, along with the development of speech recognition technology, advancements in technologies related to natural language processing or automatic speech recognition have been made. To accurately recognize the meaning of a user's utterance, named entities, such as object names, location names, names of persons, names of organizations, movie titles, or city names, need to be stored in advance in a speech recognition device.

However, because there are too many named entities that a user may utter, and new named entities would continue to be generated over time, it is difficult for a speech recognition device to store all possible named entities in advance.

Thus, when a speech recognition device receives a speech regarding a named entity that has not been stored in advance by the speech recognition device, the speech recognition device selects another named entity rather than a named entity intended by a user, and thus, the accuracy of speech recognition deteriorates.

In addition, even the same named entity may be differently pronounced by each user. In particular, even in the same linguistic sphere where the same language is used, the same named entity may be pronounced somewhat differently according to origin regions or origin countries of users.

Therefore, even though a named entity is stored in advance in a speech recognition device, when a user utters the named entity with a different pronunciation from phonemes corresponding to the named entity, the speech recognition device may select another named entity rather than the named entity intended by the user, and thus, the accuracy of speech recognition deteriorates.

DESCRIPTION OF EMBODIMENTS

Technical Problem

Embodiments of the disclosure are directed to more accurately recognizing the meaning of a speech of a user by using a speech signal generated by an utterance of the user.

In addition, embodiments of the disclosure provide a device for correcting a named entity based on a speech signal generated by an utterance of a user, and an operating method thereof.

Further, embodiments of the disclosure provide a device for adding a named entity based on a speech signal generated by an utterance of a user and on a user input, and an operating method thereof.

Additional aspects will be set forth in part in the description which follows and, in part, will be apparent from the description, or may be learned by practice of the presented embodiments of the disclosure.

Technical Solution to Problem

A speech recognition method may be provided. The method may include receiving a speech signal generated by an utterance of a user; identifying a named entity from the received speech signal; determining a speech signal portion, which corresponds to the identified named entity, from the received speech signal; generating a first acoustic embedding vector corresponding to the speech signal portion, based on an acoustic embedding model; determining a second acoustic embedding vector that is one of a plurality of acoustic embedding vectors corresponding to a plurality of named entities included in an acoustic embedding database (DB), based on distances between the plurality of acoustic embedding vectors and the first acoustic embedding vector; determining, as being a corrected named entity, a named entity corresponding to the second acoustic embedding vector, from among the plurality of named entities included in the acoustic embedding DB; and providing a result of speech recognition with respect to the speech signal, based on the corrected named entity.

A speech recognition device may be provided. The speech recognition device may include a microphone; at least one memory storing one or more instructions; and at least one processor configured to execute the one or more instructions. The instructions, when executed, may receive, via the microphone, a speech signal generated by an utterance of a user; identify a named entity from the received speech signal; determine a speech signal portion, which corresponds to the identified named entity, from the received speech signal; generate a first acoustic embedding vector corresponding to the speech signal portion, based on an acoustic embedding model; determine a second acoustic embedding vector of one of a plurality of acoustic embedding vectors corresponding to a plurality of named entities included in an acoustic embedding database (DB), based on distances between the plurality of acoustic embedding vectors and the first acoustic embedding vector; determine, as being a corrected named entity, a named entity, which corresponds to the second acoustic embedding vector, from among the plurality of named entities included in the acoustic embedding DB; and provide a result of speech recognition with respect to the speech signal, based on the corrected named entity.

DETAILED DISCLOSURE

Figure 1:
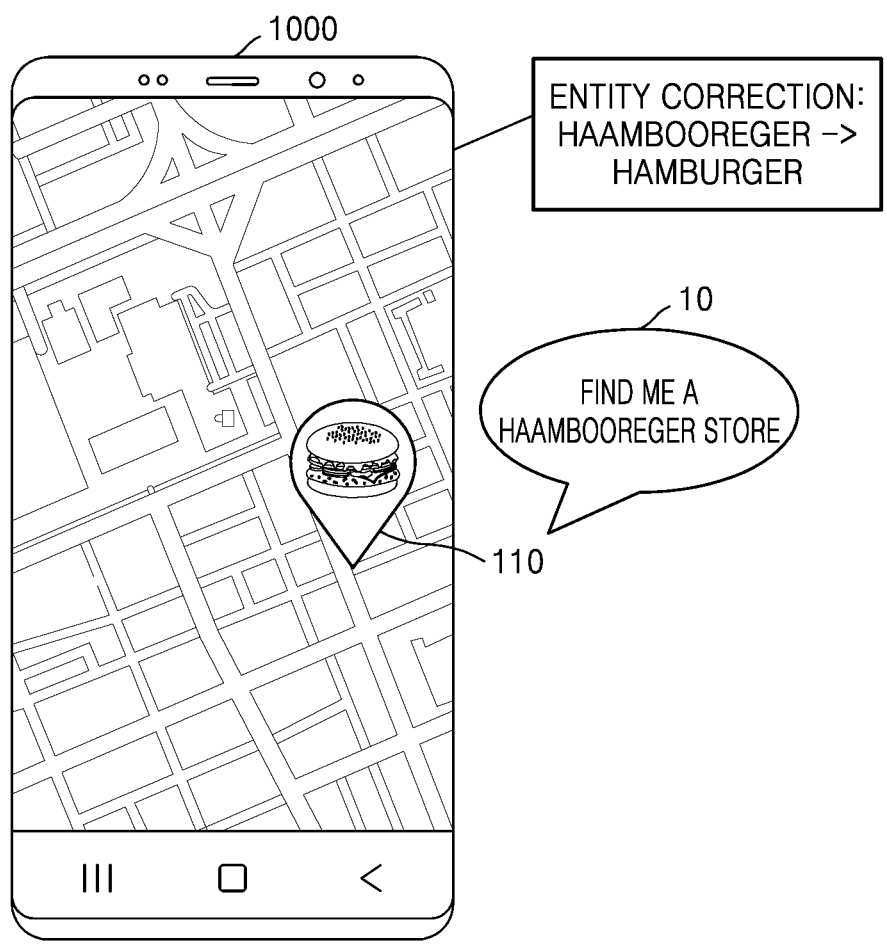
FIG. 1 illustrates an example in which a device corrects a named entity based on a speech signal of a user, according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings for those of ordinary skill in the art to easily implement the embodiments. However, it should be understood that the disclosure is not limited to embodiments described herein and may be embodied in different ways. In addition, in the drawings, portions irrelevant to the description are omitted for clarity, and throughout the specification, like components are denoted by like reference numerals.

Throughout the specification, when an element is referred to as being "connected to" another element, the element can be "directly connected to" the other element or can be "electrically connected to" the other element with an intervening element between them. In addition, when an element is referred to as "including" a component, it is meant that the element may further include another component rather than exclude the other component unless specifically stated otherwise.

Hereinafter, embodiments of the disclosure will be described in detail with reference to the accompanying drawings.

FIG. 1 illustrates an example in which a device corrects a named entity based on a speech signal of a user, according to an embodiment of the disclosure.

Referring to FIG. 1, a device 1000 may receive a speech signal generated by a user utterance 10 of "Find me a haambooreger store".

The device 1000 may determine that a sentence represented by the received speech signal is "Find me a haambooreger store", and may identify "haambooreger" and "store" among words in the sentence as being named entities.

A named entity may refer to an entity with a proper name or the name of the entity. For example, an entity with a name may include an object, a location, a person, an organization, a city, or content, and the name of the entity may include a name of an object, location, person, or organization, or a title of content.

The device 1000 may correct the identified named entity to be one of a plurality of named entities in an acoustic embedding database (DB). For example, the device 1000 may correct the named entity "haambooreger" to be "hamburger" in the acoustic embedding DB.

According to an embodiment of the disclosure, the device 1000 may correct the identified named entity, based on a speech signal portion corresponding to the identified named entity in the received speech signal. For example, the device 1000 may correct the named entity "haambooreger" to be "hamburger", based on a speech signal portion corresponding to "haambooreger"

According to an embodiment of the disclosure, the device 1000 may calculate an acoustic embedding vector of the speech signal portion, based on an acoustic embedding model, and may correct the identified named entity, based on the calculated acoustic embedding vector. For example, the device 1000 may calculate an acoustic embedding vector of the speech signal portion corresponding to "haambooreger", and may correct the named entity "haambooreger" to be "hamburger", based on the calculated acoustic embedding vector.

As the named entity is corrected, the device 1000 may provide a result of speech recognition based on the corrected named entity. For example, the device 1000 may execute a map application, based on a sentence "Find me a hamburger store", and may display, on a map, an image 110 indicating a location of the hamburger store.

Figure 2:
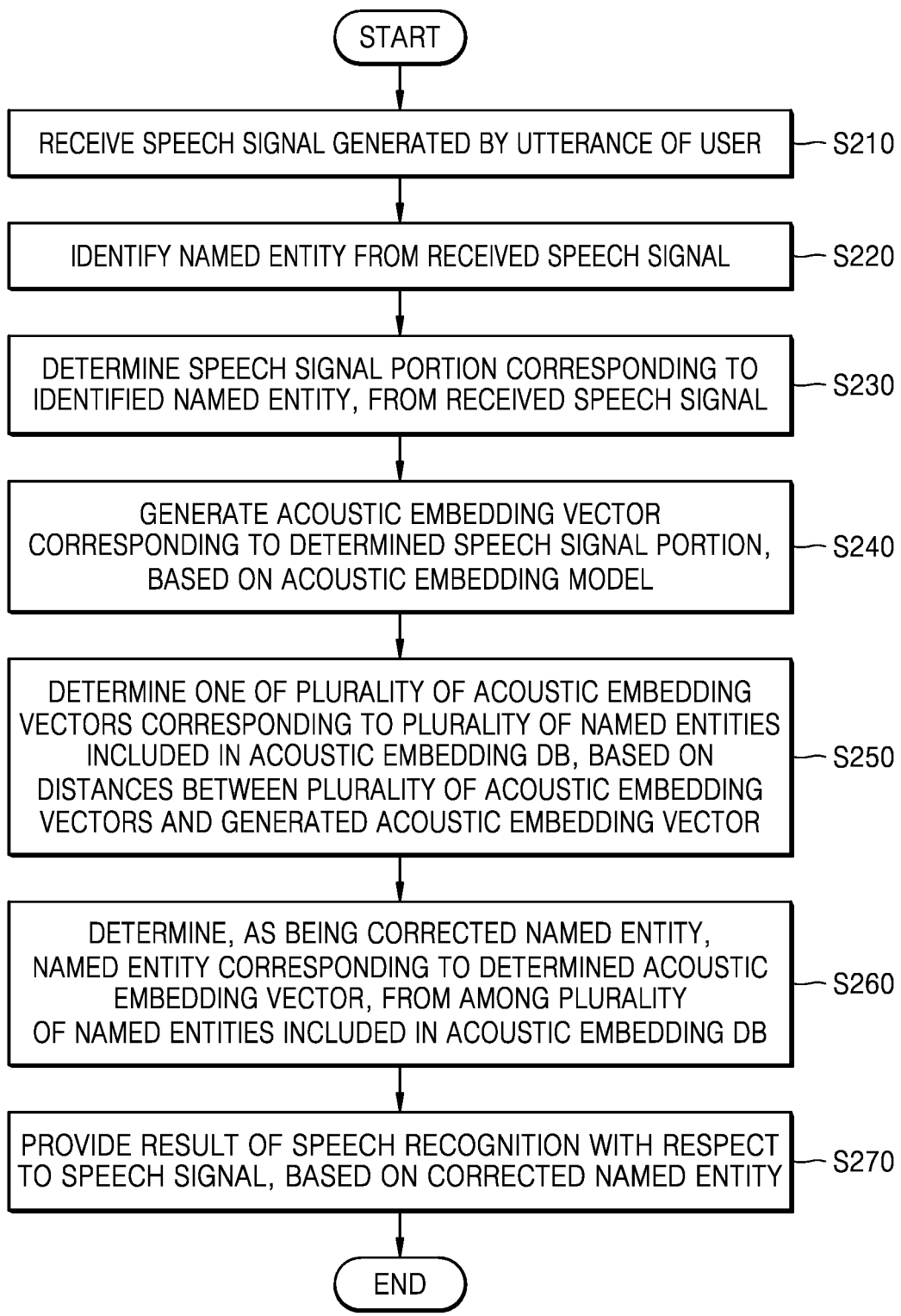
FIG. 2 illustrates a flowchart of a method, performed by a device, of performing speech recognition based on a speech of a user, according to an embodiment of the disclosure.

FIG. 2 illustrates a flowchart of a method, performed by a device, of performing speech recognition based on a speech of a user.

In operation S210, the device 1000 may receive a speech signal generated by an utterance of the user.

For example, when the user utters "Play SSeoul on Samsung Music", the device 1000 may receive a speech signal generated by the utterance.

The device 1000 may receive the speech signal generated by the utterance of the user, via a microphone included in the device 1000. In addition, the device 1000 may receive the speech signal generated by the utterance of the user, from a separate artificial intelligence speaker.

In operation S220, the device 1000 may identify a named entity from the received speech signal.

The device 1000 may determine time-domain features or frequency-domain features of the received speech signal.

As the features of the speech signal are determined, the device 1000 may determine phonemes, syllables, and words, which are elements required to construct a sentence, based on the determined features. For example, the device 1000 may determine the elements required to construct the sentence, by using an approach through dynamic programming (for example, dynamic time wrapping), an approach through probability estimation (for example, a hidden Markov model), an approach through inference using artificial intelligence, or an approach through pattern classification (for example, a neural network).

As the elements are determined, the device 1000 may determine the sentence by reconstructing the determined phonemes, syllables, and words. For example, the device 1000 may determine the sentence, based on a syntactic model or a statistical model.

The device 1000 may identify a named entity from among the words in the sentence.

For example, the device 1000 may determine that the received speech signal represents the sentence "Play SSeoul on Samsung Music", and may determine "SSeoul" to be one named entity. Accordingly, the device 1000 may generate a sentence "Play <NE> SSeoul </NE> on Samsung Music" from the received speech signal.

In addition, according to an embodiment of the disclosure, the device 1000 may determine the type of the entity "SSeoul" to be a music title. Accordingly, the device 1000 may generate a sentence "Play <song title> SSeoul </song title> on Samsung Music" from the received speech signal.

According to an embodiment of the disclosure, the device 1000 may identify a named entity from the determined sentence by applying a named entity-context tagger, which is based on text, to the determined sentence. The named entity-context tagger may include, but is not limited to, a module using a CRF-based classifier or a seq2seq tagging model.

In addition, according to another embodiment of the disclosure, when determining the sentence by reconstructing the determined phonemes, syllables, and words, the device 1000 may identify the named entity, based on the determined phonemes, syllables, and words. In this case, when the sentence is determined, the named entity in the sentence is also determined, and thus, there may be no need for a separate process for identifying the named entity from the sentence.

In operation S230, the device 1000 may determine, from the received signal, a speech signal portion corresponding to the identified named entity.

For example, the device 1000 may determine, from the received signal, a speech signal portion corresponding to "SSeoul".

When determining a phoneme, a syllable, or a word from the speech signal, the device 1000 may determine a time period of the speech signal, from which the phoneme, the syllable, or the word is extracted, in correspondence with the phoneme, the syllable, or the word. Based on the determined time period, the device 1000 may determine a time period corresponding to the identified named entity, and may determine a speech signal portion corresponding to the determined time period to be the speech signal portion corresponding to the identified named entity.

In operation S240, the device 1000 may generate an acoustic embedding vector corresponding to the determined speech signal portion, based on an acoustic embedding model.

The acoustic embedding model may be a model for converting one speech signal into one acoustic embedding vector in an acoustic embedding space. The acoustic embedding model may be trained by various artificial intelligence algorithms in such a manner that, as speech signals are more similar to each other, acoustic embedding vectors corresponding to the speech signals are located more closer to each other.

In operation S250, the device 1000 may determine one of a plurality of acoustic embedding vectors, which correspond to a plurality of named entities included in an acoustic embedding DB, based on distances between the plurality of acoustic embedding vectors and the generated acoustic embedding vector.

The acoustic embedding DB may store acoustic embedding vectors in correspondence with named entities. One acoustic embedding vector may correspond to one named entity, and the acoustic embedding vector may be converted from a speech signal generated by uttering the named entity, based on the acoustic embedding model.

In addition, the acoustic embedding DB may store a plurality of acoustic embedding vectors corresponding to one named entity. As one named entity may be pronounced with different pronunciations, the one named entity may correspond to two or more embedding vectors converted from different speech signals. The different speech signals may be, for example, speech signals according to pronunciations of the named entity in different linguistic spheres. In addition, the different speech signals may be speech signals for the named entity, which are generated by persons with different genders, ages, emotional states, accents, dialects, or uttering speeds. According to some embodiments, the acoustic embedding DB may store a plurality of acoustic embedding vectors corresponding to a named entity in all languages.

According to an embodiment of the disclosure, the device 1000 may determine an acoustic embedding vector closest in distance to the generated acoustic embedding vector, from among the plurality of acoustic embedding vectors. For example, although the device 1000 may determine a nearest embedding vector by using a locality-sensitive hashing tree algorithm to achieve O(log N) complexity of search (where N is a size of the acoustic embedding DB), the disclosure is not limited thereto.

In operation S260, the device 1000 may determine, as being a corrected named entity, a named entity corresponding to the acoustic embedding vector, which is determined from among the plurality of acoustic embedding vectors included in the acoustic embedding DB.

For example, when the named entity corresponding to the determined acoustic embedding vector is "Seoul", the device 1000 may determine "Seoul" to be the corrected named entity.

In operation S270, the device 1000 may provide a result of speech recognition with respect to the speech signal, based on the corrected named entity.

For example, the device 1000 may reproduce a song "Seoul", based on a sentence "Play Seoul on Samsung Music".

According to an embodiment of the disclosure, the device 1000 may execute an application providing content regarding the corrected named entity as the result of the speech recognition. For example, the device 1000 may execute a music reproduction application to reproduce the song "Seoul".

According to an embodiment of the disclosure, when the device 1000 receives a user input for the provided content, the device 1000 may store the generated embedding vector in the acoustic embedding DB in correspondence with the corrected named entity. Such an embodiment will be described below with reference to FIGS. 8 to 10.

In addition, according to an embodiment of the disclosure, the device 1000 may determine at least one candidate embedding vector in addition to the determined acoustic embedding vector, based on the distances between the plurality acoustic embedding vectors and the generated acoustic embedding vector. In addition, the device 1000 may determine at least one candidate named entity corresponding to the determined at least one candidate embedding vector. Further, the device 1000 may provide a menu for selecting one of the determined at least one candidate entity, in addition to the result of the speech recognition.

In addition, according to an embodiment of the disclosure, the device 1000 may receive a user input for selecting one of the determined at least one candidate entity, and may provide the result of the speech recognition with respect to the speech signal, based on the determined candidate named entity. Further, the device 1000 may store the generated embedding vector in the acoustic embedding DB to correspond to the selected candidate entity. Such an embodiment will be described below with reference to FIGS. 11 and 12.

In addition, according to an embodiment of the disclosure, the device 1000 may display a menu for selecting the identified named entity from the received speech signal, in addition to the result of the speech recognition based on the corrected named entity. Further, when the device 1000 receives a user input for selecting the identified named entity, the device 1000 may store the generated acoustic embedding vector in the acoustic embedding DB to correspond to the identified named entity. Furthermore, the device 1000 may provide the result of the speech recognition with respect to the speech signal, based on the identified named entity. Such an embodiment will be described below with reference to FIGS. 13 to 15.

Figure 3:
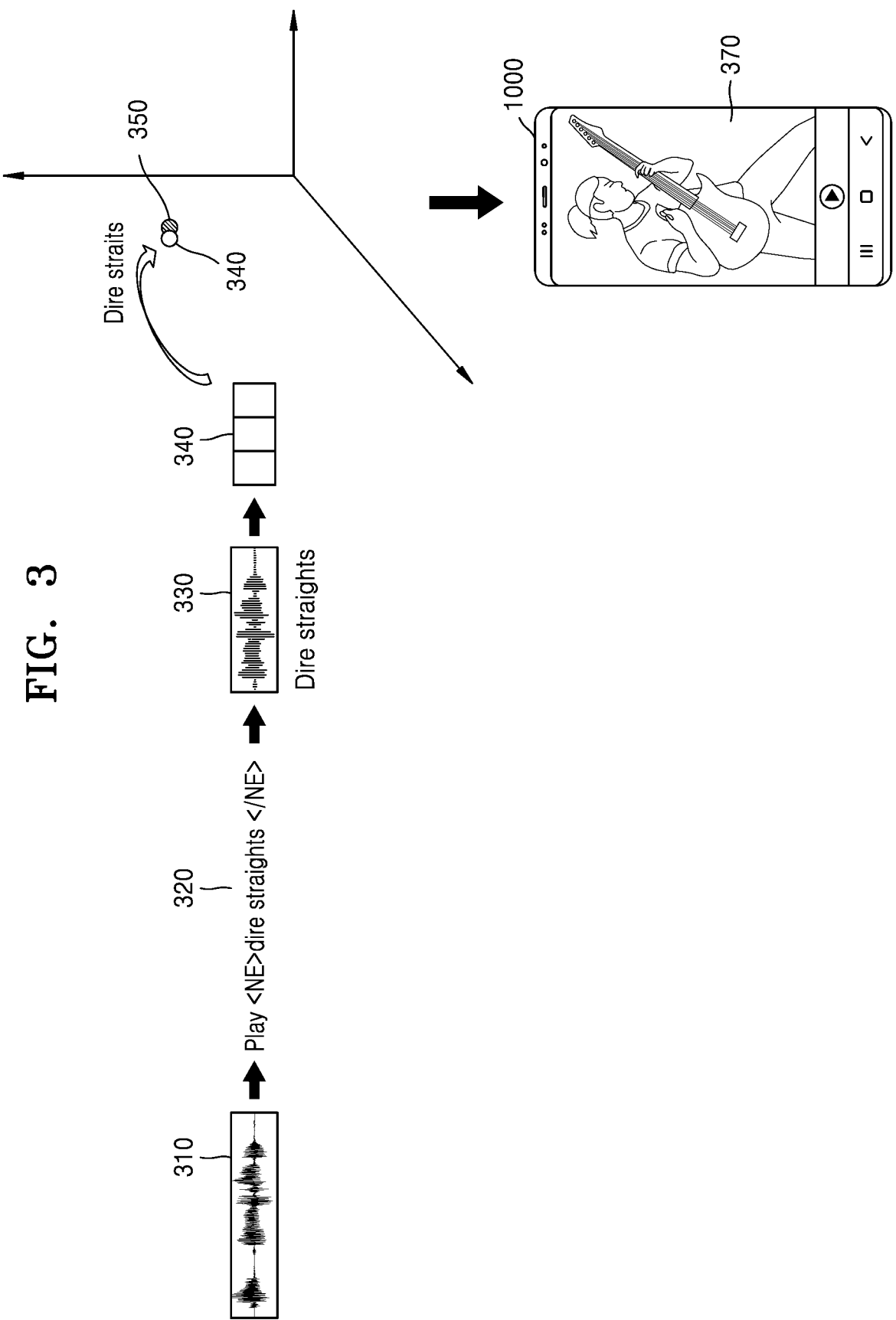
FIG. 3 illustrates a method, performed by a device, of performing speech recognition based on a speech signal generated by an utterance of a user, according to an embodiment of the disclosure.

FIG. 3 illustrates a method, performed by a device, of performing speech recognition based on a speech signal generated by an utterance of a user, according to an embodiment of the disclosure.

Referring to FIG. 3, the device 1000 may perform more accurate speech recognition by correcting a named entity based on a speech signal.

A name of a music band "dire straights" may be referred to as a name "dire straits" according to persons or regions. Although a pronunciation of "dire straights" may be almost similar to a pronunciation of "dire straits", there may be a slight difference between them.

The device 1000 may receive a speech signal 310 of a user, which utters "Play dire straights".

In addition, the device 1000 may determine that a sentence represented by the received speech signal 310 is "Play dire straights", and may determine "dire straights" in the sentence to be a named entity 320.

Further, the device 1000 may determine, from the received speech signal 310, a speech signal portion 330 corresponding to the determined named entity 320. In addition, the device 1000 may generate an acoustic embedding vector 340 for the speech signal portion 330, based on a pre-trained acoustic embedding model. Further, the device 1000 may determine an acoustic embedding vector 350 closest to the generated acoustic embedding vector 340, from among a plurality of acoustic embedding vectors in an acoustic embedding DB. Although acoustic embedding vectors are illustrated three-dimensionally in FIG. 3, this is merely for convenience of description, the dimension of the acoustic embedding vectors may be one of tens to hundreds of dimensions, and the disclosure is not limited thereto.

In addition, the device 1000 may obtain, from the acoustic embedding DB, "Dire straits" as a named entity corresponding to the determined acoustic embedding vector 350. Further, the device 1000 may change "dire straights", which is the named entity determined from the received speech signal 310, to "Dire straits", which is a corrected named entity.

Furthermore, the device 1000 may execute an application for reproducing music by a musician "dire straits", based on a sentence "Play dire straits".

Figure 4:
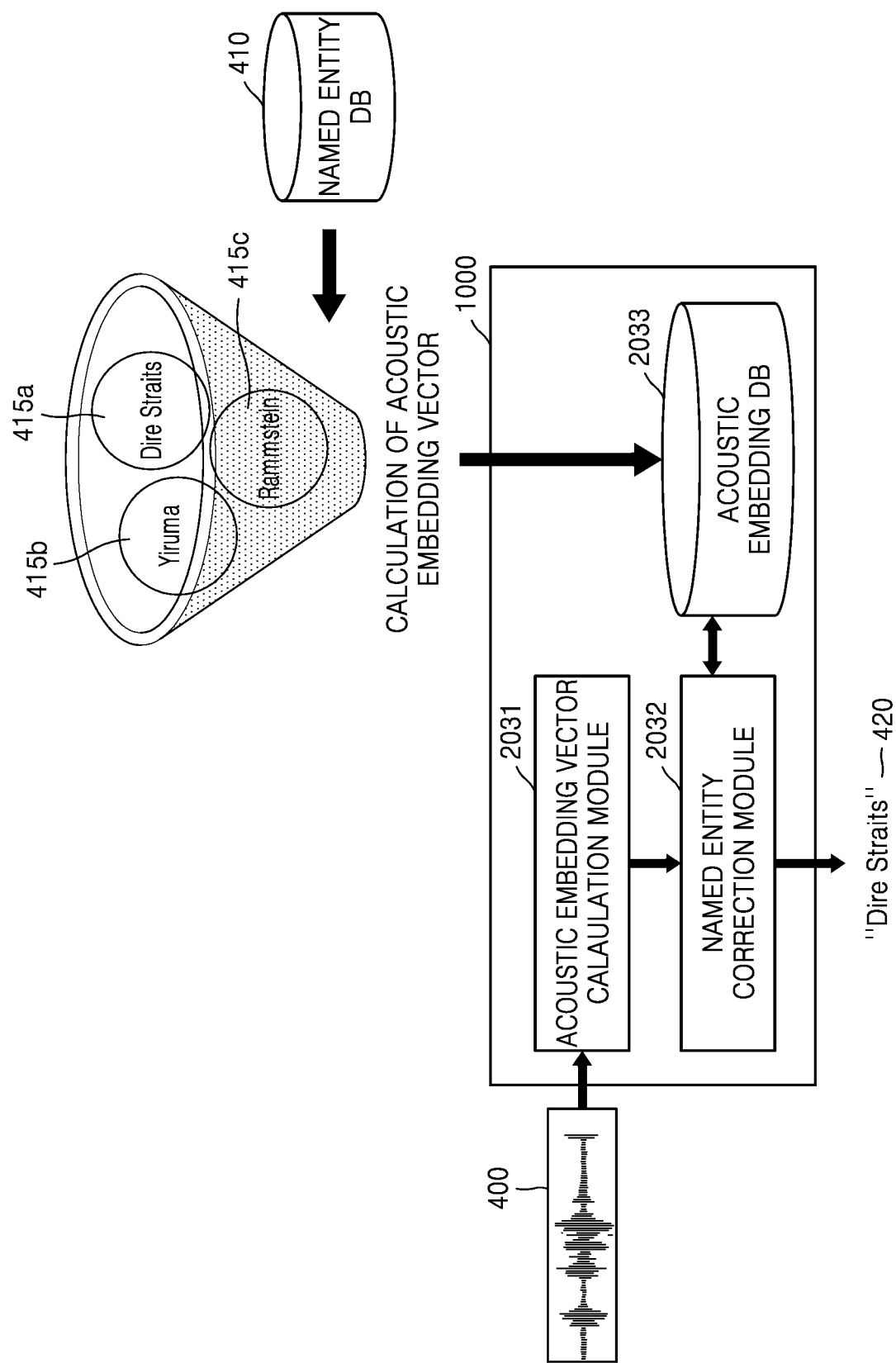
FIG. 4 illustrates an acoustic embedding database (DB) and a method of performing speech recognition based on the acoustic embedding DB, according to an embodiment of the disclosure.

FIG. 4 illustrates an acoustic embedding DB and a method of performing speech recognition based on the acoustic embedding DB, according to an embodiment of the disclosure.

Referring to FIG. 4, at least one acoustic embedding vector corresponding to each named entity stored in a named entity DB 410 may be calculated in advance and stored in an acoustic embedding DB 2033. The named entity DB 410 may be a DB storing numerous named entities.

For example, when a named entity "Dire straits" is stored in the named entity DB 410, an acoustic embedding vector may be calculated based on an acoustic signal generated by an utterance of "Dire straits", and the calculated embedding vector may be stored in the acoustic embedding DB to correspond to "Dire straits".

One acoustic embedding vector may be stored in correspondence with one named entity, and a plurality of acoustic embedding vectors may be stored for one named entity.

When a speech signal 400, which is generated when a user utters "dire straights", is obtained, an acoustic embedding vector calculation module 2031 may calculate an acoustic embedding vector for the speech signal 400, based on a pre-trained acoustic embedding model. A named entity correction module 2032 may determine an acoustic embedding vector closest to the calculated acoustic embedding vector, from among a plurality of acoustic embedding vectors stored in the acoustic embedding DB 2033.

When a named entity corresponding to the determined acoustic embedding vector is "Dire Straits", the named entity correction module 2032 may determine "Dire Straits" to be a corrected named entity 420.

Figure 5:
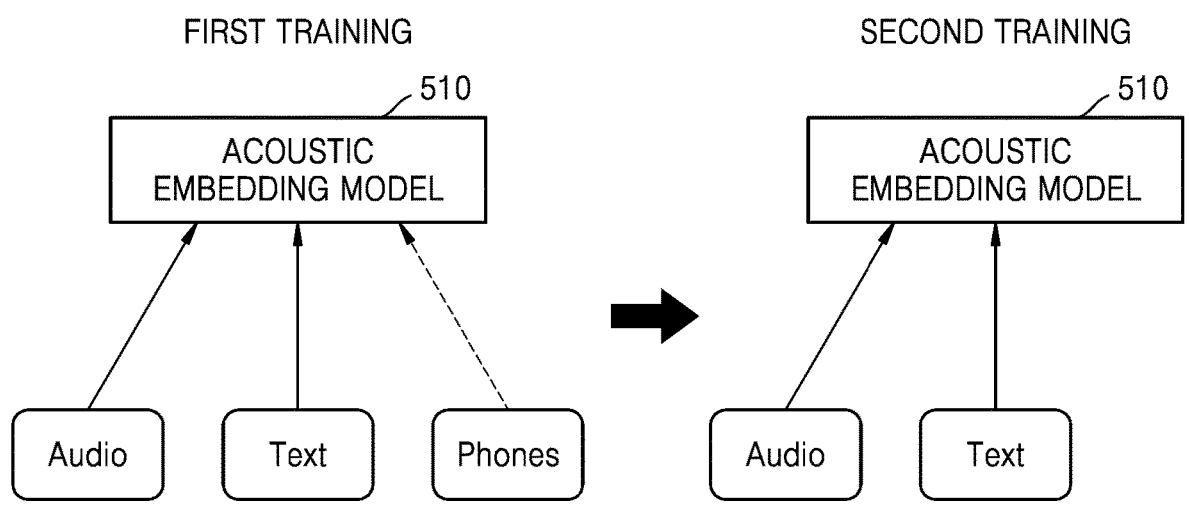
FIG. 5 illustrates a method of training an acoustic embedding model, according to an embodiment of the disclosure.

FIG. 5 illustrates a method of training an acoustic embedding model, according to an embodiment of the disclosure.

Referring to FIG. 5, an acoustic embedding model may be trained by various artificial intelligence algorithms in such a manner that, as speech signals are more similar to each other, acoustic embedding vectors corresponding to the speech signals are located more closer to each other.

For example, the acoustic embedding model may be trained by using at least one of algorithms including Siamese Convolutional Neural Network (CNN), Siamese Long Short Term Memory (LSTM), Seq2Seq Autoencoder, Multi-view embeddings, Phonetically-associated Siamese network, Seq2Seq Correspondence Autoencoder, Linguistically-informed embeddings, Embeddings with temporal context, Multi-view Encoder-Decoder embeddings, Downsampling, Reference vector, Convolutional vector regression, Letter-ngram embeddings, Correspondence Autoencoder, and LSTM embeddings, although the disclosure is not limited thereto.

First, for each named entity, the acoustic embedding model may be trained using a training data set, which includes a text (corresponding to 'Text' in FIG. 5) representing a named entity, a phoneme label (corresponding to 'Phones' in FIG. 5) corresponding to the text, and a speech signal (corresponding to 'Audio' in FIG. 5) generated by uttering the named entity.

Next, the phoneme label is disabled in the acoustic embedding model trained by using the training data set including the text, the phoneme label, and the speech signal, and then, the acoustic embedding model may be tuned in such a manner that the same acoustic embedding vector (an acoustic embedding vector that is output by the acoustic embedding model including the phoneme label) is output for the same text and the same speech signal but without the phoneme label. Thus, the acoustic embedding model may be trained using phonetically transcribed data as well as non-transcribed data.

Accordingly, the device 1000 may convert an input speech signal into an acoustic embedding vector by using the acoustic embedding model, with no need to convert the input speech signal into phonemes.

By converting the input speech signal into phonemes, followed by converting the converted phonemes into a text, and then comparing the converted text with the named entities in the named entity DB 410, the named entity may be corrected, the device 1000 may quickly and accurately correct the named entity by converting the input speech signal into an acoustic embedding vector and then finding an acoustic embedding vector closest in distance thereto from among the acoustic embedding vectors in the acoustic embedding DB 2033.

Figure 6:
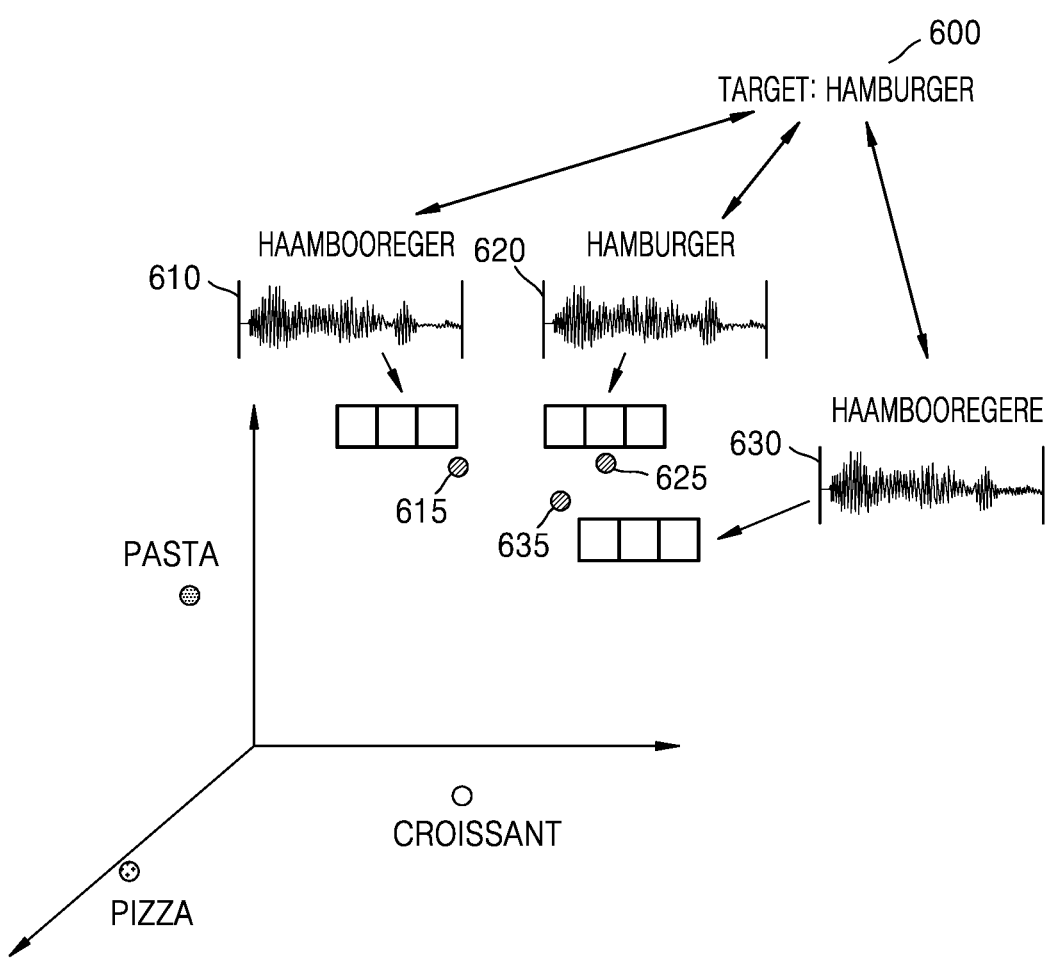
FIG. 6 illustrates a method of storing a plurality of acoustic embedding vectors in an acoustic embedding DB in correspondence with one named entity, according to an embodiment of the disclosure.

FIG. 6 illustrates a method of storing a plurality of acoustic embedding vectors in an acoustic embedding DB in correspondence with one named entity, according to an embodiment of the disclosure.

Referring to FIG. 6, a plurality of acoustic embedding vectors may be stored in the acoustic embedding DB 2033 to correspond to one named entity.

Although the food "hamburger" is consumed in various countries, "hamburger" is called with somewhat different pronunciations in respective countries. For example, the food "hamburger" is referred to as "hamburger" in a first linguistic sphere, as "haambooreger" or "haambooger" in a second linguistic sphere, as "haambooregere" in a third linguistic sphere, and as "haambargar" in a fourth linguistic sphere.

Thus, in the case where only an embedding vector corresponding to a speech signal, which is generated by uttering "hamburger" in correspondence with the named entity "hamburger", is stored, when a user utters "haambooreger", "haambooger", "haambooregere", and "haambargar", there may be cases where such an utterance is not recognized as "hamburger".

In correspondence with a named entity 600 "hamburger", the acoustic embedding DB 2033 may store an acoustic embedding vector 615 converted from a speech signal 610, which is generated by uttering "haambooreger", an acoustic embedding vector 625 converted from a speech signal 620, which is generated by uttering "hamburger", and an acoustic embedding vector 635 converted from a speech signal 630, which is generated by uttering "haambooregere".

Figure 7:
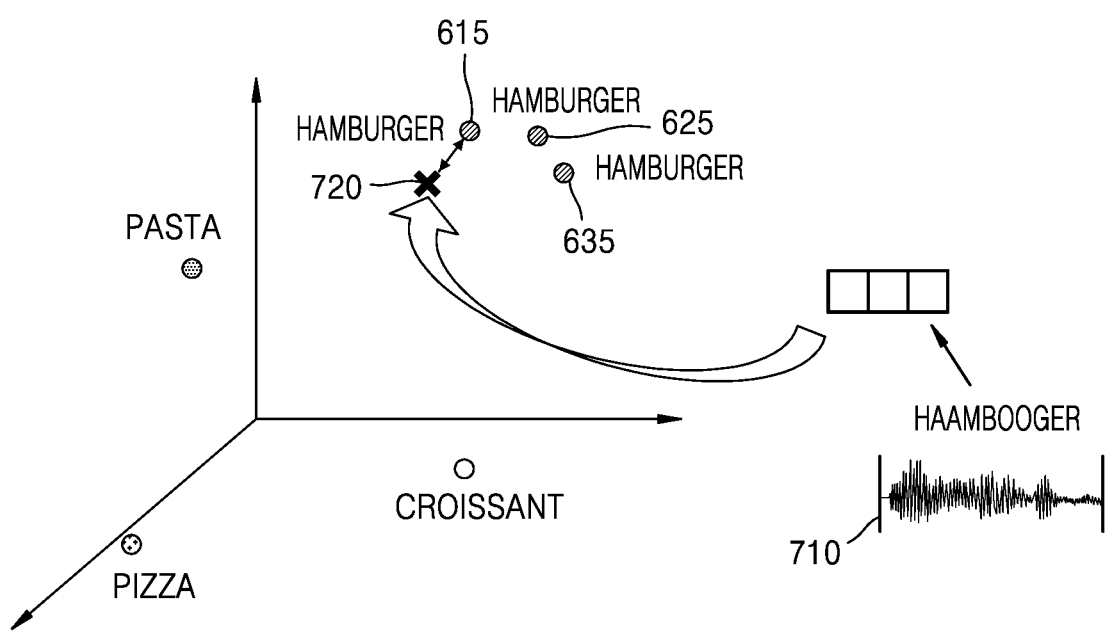
FIG. 7 illustrates a method, performed by a device, of correcting a named entity based on a speech signal, according to an embodiment of the disclosure.

FIG. 7 illustrates a method, performed by a device, of correcting a named entity based on a speech signal, according to an embodiment of the disclosure.

Referring to FIG. 7, the device 1000 may convert a speech signal 710 into an acoustic embedding vector 720, and may correct a named entity based on the converted acoustic embedding vector 720.

The embedding vectors 615, 625, and 635, which are shown in FIG. 7, corresponding to "hamburger" are embedding vectors of acoustic signals generated by uttering "haambooreger", "hamburger", and "haambooregere", as described with reference to FIG. 6.

When a user in the second linguistic sphere utters "haambooger" while intending "hamburger", the device 1000 may receive the speech signal 710 generated by the utterance of "haambooger", and may convert the received speech signal 710 into the acoustic embedding vector 720, based on a pre-trained acoustic embedding model.

The device 1000 may determine the acoustic embedding vector 615 closest to the converted acoustic embedding vector 720 from among the acoustic embedding vectors stored in the acoustic embedding DB 2033 by interworking with the acoustic embedding DB 2033. The device 1000 may determine "hamburger", which is a named entity corresponding to the determined acoustic embedding vector 615, as being a corrected named entity.

In addition, even when the user utters "haambooreger" or "haambooregere" while intending "hamburger", the device 1000 may determine "hamburger" to be the corrected named entity, based on the speech signal.

Therefore, even when there are various pronunciations of one named entity, the device 1000 may accurately recognize the named entity intended by the user.

Figure 8:
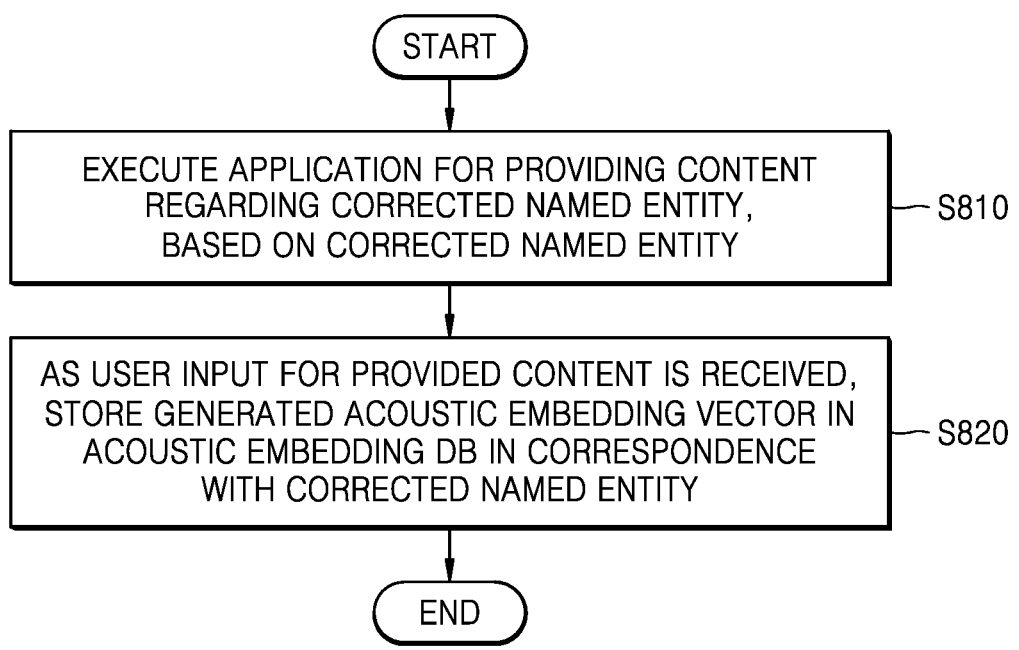
FIG. 8 illustrates a flowchart of a method, performed by a device, of storing a speech signal of a user in correspondence with a named entity, according to an embodiment of the disclosure.

FIG. 8 illustrates a flowchart of a method, performed by a device, of storing a speech signal of a user in correspondence with a named entity, according to an embodiment of the disclosure.

In operation S810, the device 1000 may execute an application for providing content regarding a corrected named entity, based on the corrected named entity.

The device 1000 may execute the application for providing the content regarding the corrected named entity, based on a result of recognition of a speech including the corrected named entity.

In operation S820, when the device 1000 receives a user input for the provided content, the device 1000 may store a generated acoustic embedding vector in an acoustic embedding DB to correspond to a corrected named entity.

When receiving the user input for the provided content, the device 1000 may determine that the corrected named entity is consistent with a named entity intended by the user, and may store the generated acoustic embedding vector in the acoustic embedding DB to correspond to the corrected named entity.

According to some embodiments of the disclosure, the device 1000 may store the generated acoustic embedding vector in the acoustic embedding DB to correspond to the corrected named entity, only when the generated acoustic embedding vector is separated from an acoustic embedding vector nearest thereto by as much as a reference distance or more.

According to some embodiments of the disclosure, the device 1000 may store the generated embedding vector in the acoustic embedding DB to correspond to a user account and the corrected named entity.

Accordingly, the acoustic embedding vector reflecting speech features of the user is stored to correspond to the named entity, and thus, an accurate speech recognition service may be provided according to each user.

Figure 9:
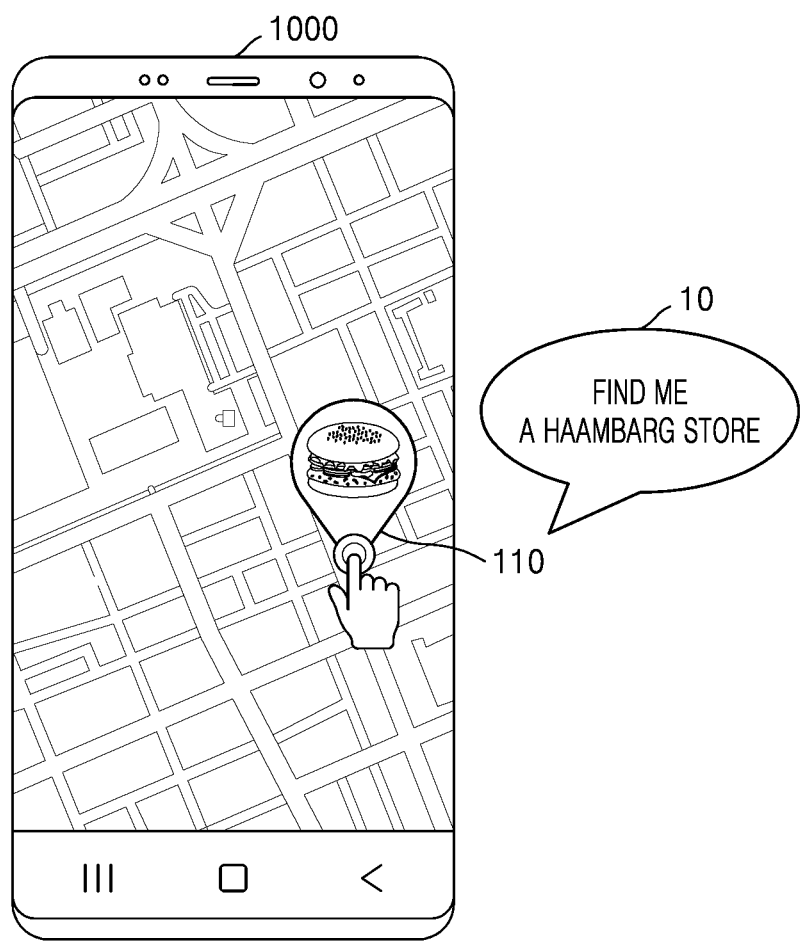
FIGS. 9 and 10 illustrate a method, performed by a device, of storing a speech signal of a user in correspondence with a named entity, according to an embodiment of the disclosure.
Figure 10:
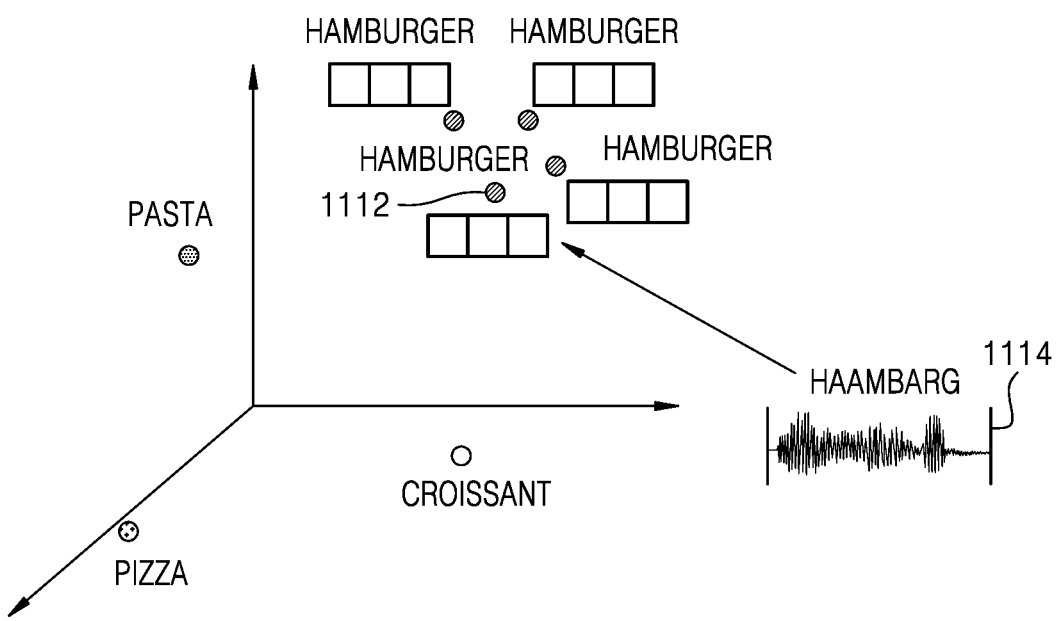

FIGS. 9 and 10 illustrate a method, performed by a device, of storing a speech signal of a user in correspondence with a named entity, according to an embodiment of the disclosure.

Referring to FIG. 9, when a user utters "Find me a haambarg store", a speech signal generated by the user utterance 10 may be received.

The device 1000 may determine "Find me a haambarg store" to be a sentence represented by the received speech signal. In addition, the device 1000 may determine "haambarg" and "store" to be named entities.

The device 1000 may determine "hamburger" to be a corrected named entity of "haambarg", based on a speech signal portion corresponding to "haambarg".

The device 1000 may determine that the intension of the user utterance is to request information about a restaurant providing "hamburger". Accordingly, the device 1000 may execute a map application and display the image 110 indicating a location of a "hamburger" restaurant around the user on a map.

When the device 100 receives a user input for selecting the image indicating the location of the "hamburger" restaurant, the device 100 may determine that "hamburger", which is the corrected named entity, is consistent with the named entity intended by the user.

Referring to FIG. 10, as the corrected named entity is determined to be consistent with the named entity intended by the user, an acoustic embedding vector 1112 of a speech signal portion 1114 corresponding to "haambarg" may be stored in the acoustic embedding DB to correspond to "hamburger".

Figure 11:
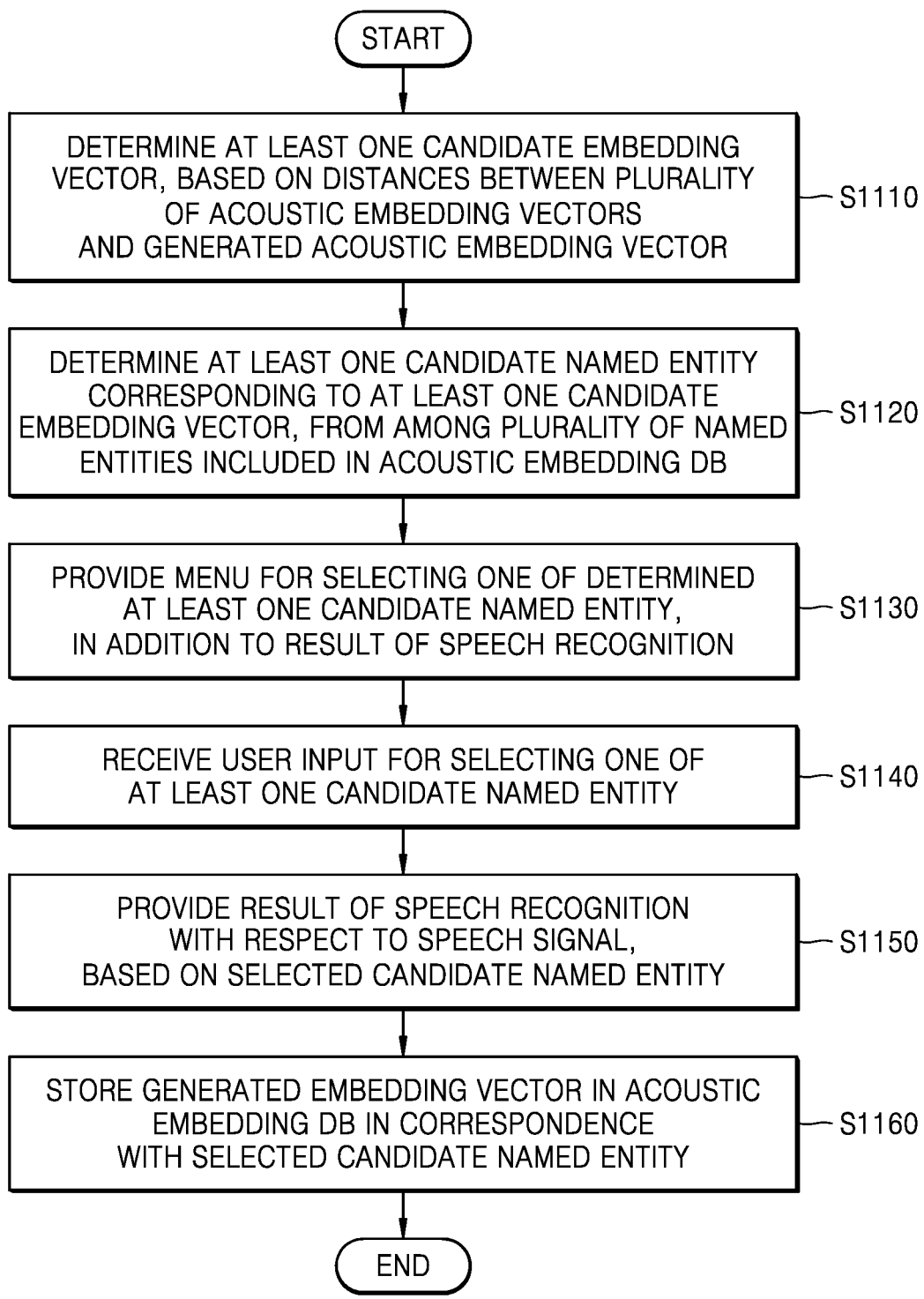
FIG. 11 illustrates a flowchart of a method, performed by a device, of providing a candidate named entity based on a speech signal of a user, according to an embodiment of the disclosure.

FIG. 11 illustrates a flowchart of a method, performed by a device, of providing a candidate named entity based on a speech signal of a user, according to an embodiment of the disclosure.

In operation S1110, the device 1000 may determine at least one candidate embedding vector, based on distances between a plurality of acoustic embedding vectors and a generated acoustic embedding vector.

The device 1000 may determine the at least one candidate embedding vector, based on the priority of a smaller distance from the generated acoustic embedding vector, except for an acoustic embedding vector closest to the generated acoustic embedding vector, from among a plurality of acoustic embedding vectors included in an acoustic embedding DB.

In operation S1120, the device 1000 may determine at least one candidate named entity corresponding to the at least one candidate embedding vector, from among a plurality of named entities included in a named entity embedding DB.

In operation S1130, the device 1000 may provide a menu for selecting one of the determined at least one candidate named entity, in addition to a result of speech recognition.

The device 1000 may provide the result of the speech recognition, based on a corrected named entity. In addition, the menu for selecting one of the determined at least one candidate named entity, together with the result of the speech recognition based on the corrected named entity, may be provided.

In operation S1140, the device 1000 may receive a user input for selecting one of the at least one candidate named entity.

When the corrected named entity is not a named entity intended by the user and one of the displayed at least one candidate named entity is the named entity intended by the user, the device 1000 may receive the user input for selecting one of the at least one candidate named entity.

In operation S1150, the device 1000 may provide the result of the speech recognition with respect to the speech signal, based on the selected candidate named entity.

The device 1000 may provide the result of the speech recognition with respect to the speech signal again, based on the selected candidate named entity.

In operation S1160, the device 1000 may store the generated embedding vector in the acoustic embedding DB to correspond to the selected candidate named entity.

According to some embodiments of the disclosure, the device 1000 may store the generated embedding vector in the acoustic embedding DB to correspond to a user account and the selected candidate named entity.

Figure 12:
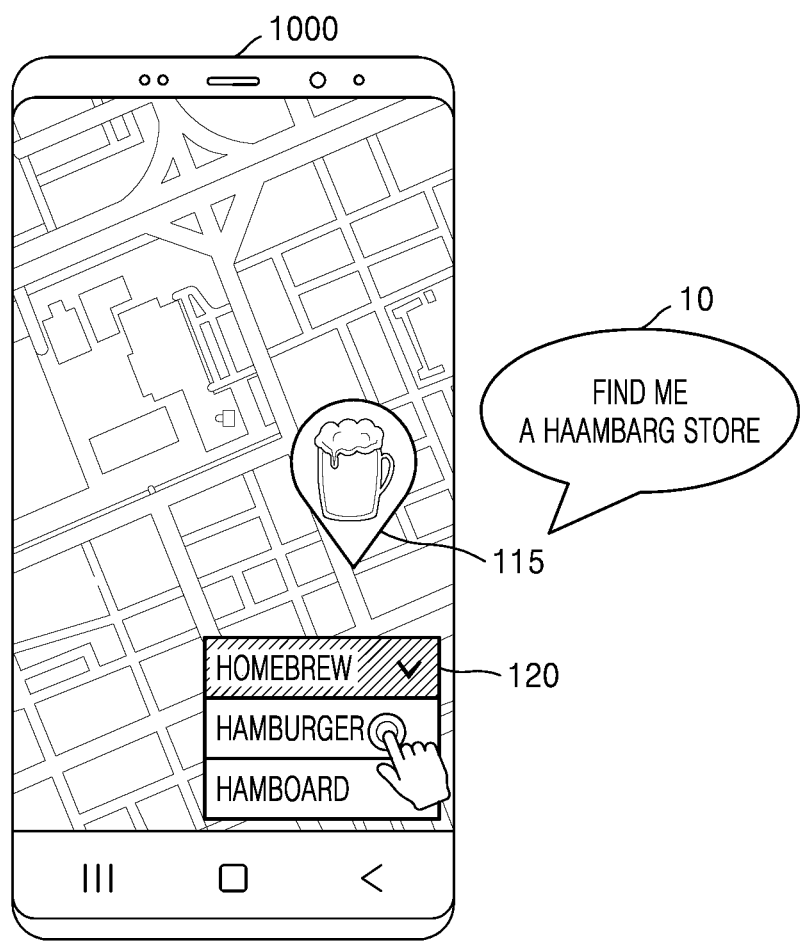
FIG. 12 illustrates a method, performed by a device, of providing a candidate named entity based on a speech signal of a user, according to an embodiment of the disclosure.

FIG. 12 illustrates a method, performed by a device, of providing a candidate named entity based on a speech signal of a user, according to an embodiment of the disclosure.

Referring to FIG. 12, when a user utters "Find me a haambarg store", a speech signal generated by the user utterance 10 may be received. In addition, the device 1000 may determine "Find me a haambarg store" to be a sentence represented by the received speech signal. Further, the device 1000 may determine "haambarg" and "store" to be named entities.

When a named entity corresponding to an acoustic embedding vector, which is closest to an acoustic embedding vector of a speech signal portion corresponding to "haambarg", is "homebrew", the device 1000 may determine "homebrew" to be a corrected named entity of "haambarg".

In addition, when a named entity corresponding to an acoustic embedding vector, which is second closest to the acoustic embedding vector of the speech signal portion corresponding to "haambarg", is "hamburger" and a named entity corresponding to an acoustic embedding vector, which is third closest thereto, is "hamboard", the device 1000 may display "hamburger" and "hamboard" as candidate named entities.

The device 1000 may determine that the intension of the user utterance is to request information about a location of a craft beer specialty store, based on "homebrew" which is a corrected named entity, may execute a map application, and may display the image 115 indicating the location of the craft beer specialty store around the user on a map.

In addition, the device 1000 may provide the menu 120 for selecting one of "hamburger" and "hamboard", which are at least one candidate named entity, in addition to providing the map image based on "homebrew".

When the user intention for "haambarg" is "hamburger", the device 1000 may receive a user input for selecting "hamburger" from the menu 120.

The device 1000 may change the intention of the user utterance to a request for information about a location of a hamburger restaurant, based on "hamburger" that is selected, and may display an image indicating the location of the hamburger restaurant on the map.

In addition, the device 1000 may store an acoustic embedding vector of a speech signal portion corresponding to "haambarg" in an acoustic embedding DB to correspond to "hamburger".

Accordingly, from now on, for the user utterance "haambarg", by recognizing the user utterance as "hamburger" rather than "homebrew", the device 1000 may provide a more accurate speech recognition service.

Figure 13:
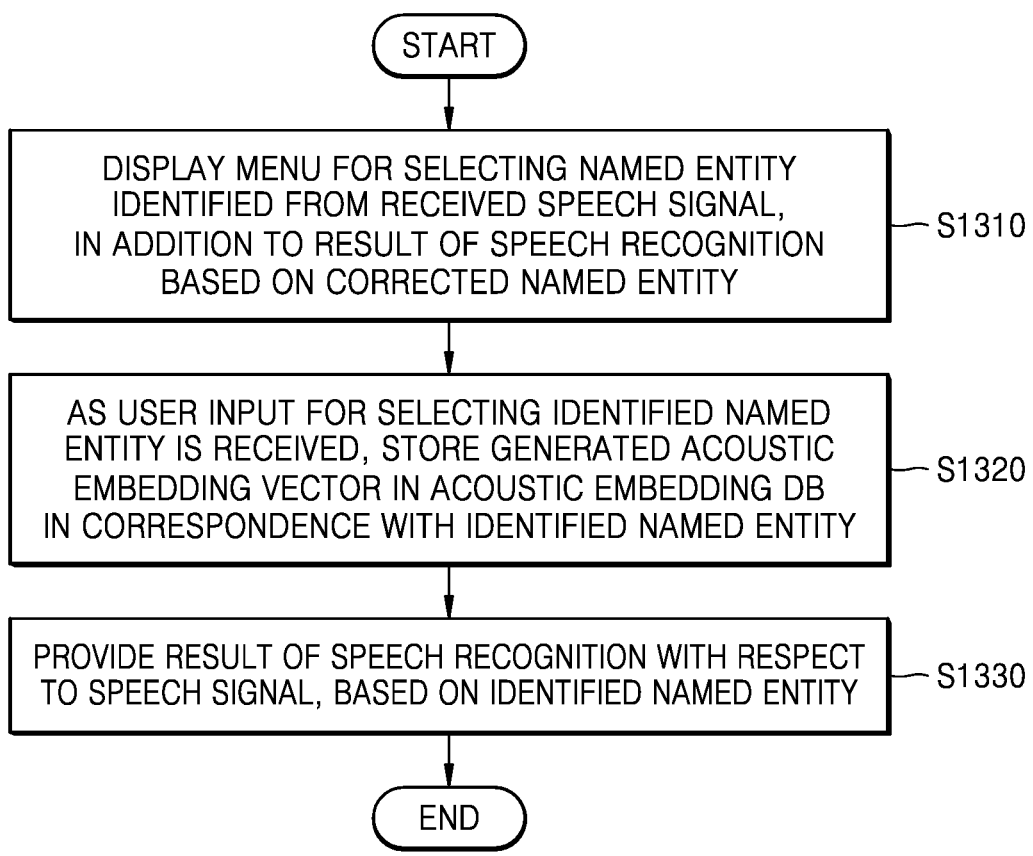
FIG. 13 illustrates a flowchart of a method, performed by a device, of storing a new named entity based on a speech signal of a user, according to an embodiment of the disclosure.

FIG. 13 illustrates a flowchart of a method, performed by a device, of storing a new named entity based on a speech signal of a user, according to an embodiment of the disclosure.

In operation S1310, the device 1000 may display a menu for selecting a named entity identified from a received speech signal, in addition to a result of speech recognition based on a corrected named entity.

The named entity identified from the received speech signal may be a series of phonemes converted from the received speech signal.

The device 1000 the device 1000 may display a menu for selecting an original named entity identified from the received speech signal, in addition to the result of the speech recognition based on the corrected named entity.

In operation S1320, when the device 1000 receives a user input for selecting the identified named entity, the device 1000 may store a generated acoustic embedding vector in an acoustic embedding DB to correspond to the identified named entity.

When the device 1000 receives the user input for selecting the identified named entity, the device 1000 may determine that the identified named entity, rather than the corrected named entity, is a named entity consistent with the intention of the user utterance. For example, when the user utters a new named entity that is not stored in the acoustic embedding DB, although the device 1000 provides the result of the speech recognition based on the corrected named entity rather than the identified named entity, the identified named entity may be a named entity intended by the user.

The device 1000 may determine that the identified named entity is the new named entity not stored in the acoustic embedding DB, and may store the generated acoustic embedding vector in the acoustic embedding DB to correspond to the identified named entity.

According to some embodiments of the disclosure, the device 1000 may store the generated embedding vector in the acoustic embedding DB to correspond to a user account and the identified named entity.

In operation S1330, the device 1000 may provide the result of the speech recognition with respect to the speech signal, based on the identified named entity.

The device 1000 may provide the result of the speech recognition with respect to the speech signal again, based on the identified named entity rather than the corrected named entity.

Figure 14:
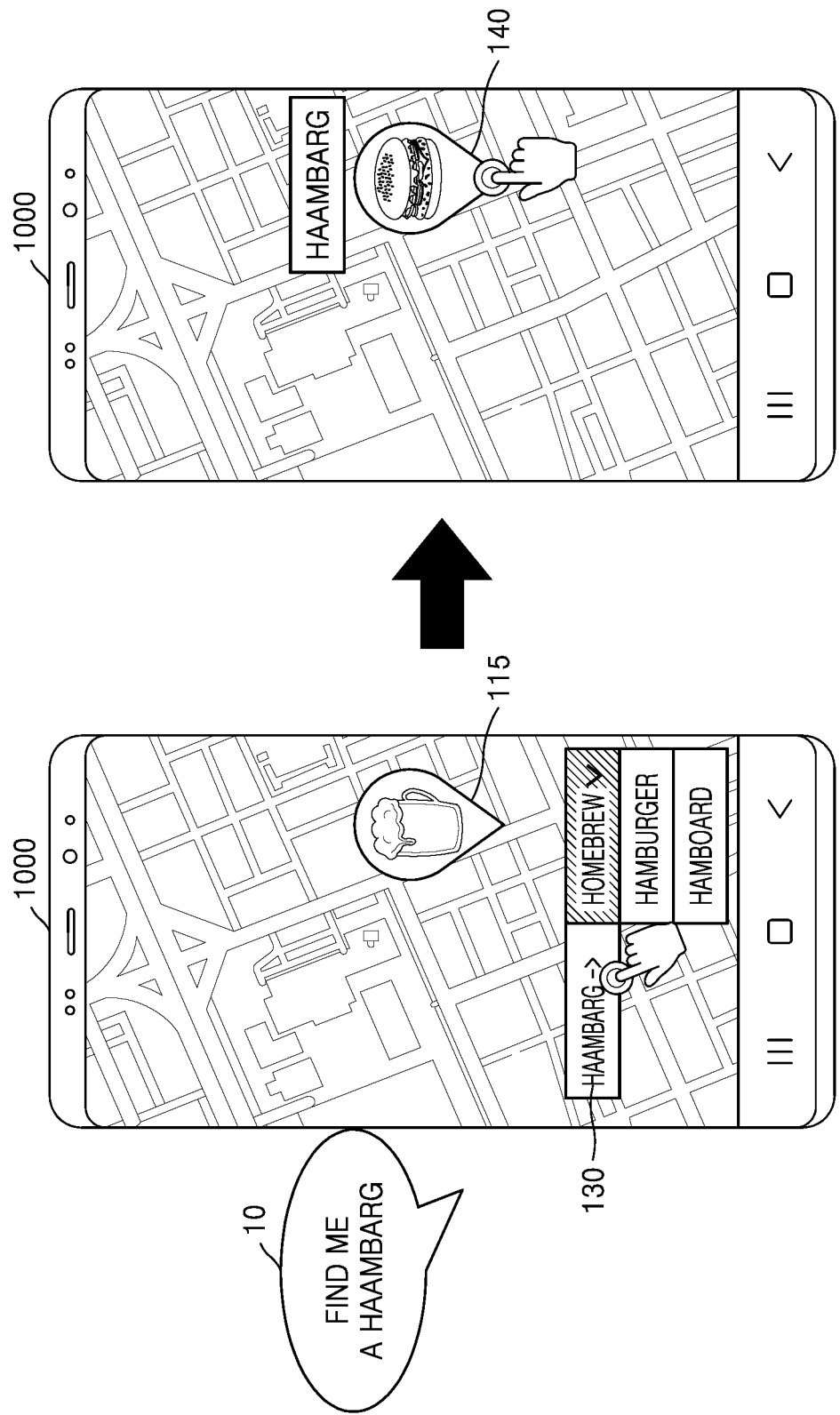
FIGS. 14 and 15 illustrate a method, performed by a device, of storing a new named entity based on a speech signal of a user, according to an embodiment of the disclosure.
Figure 15:
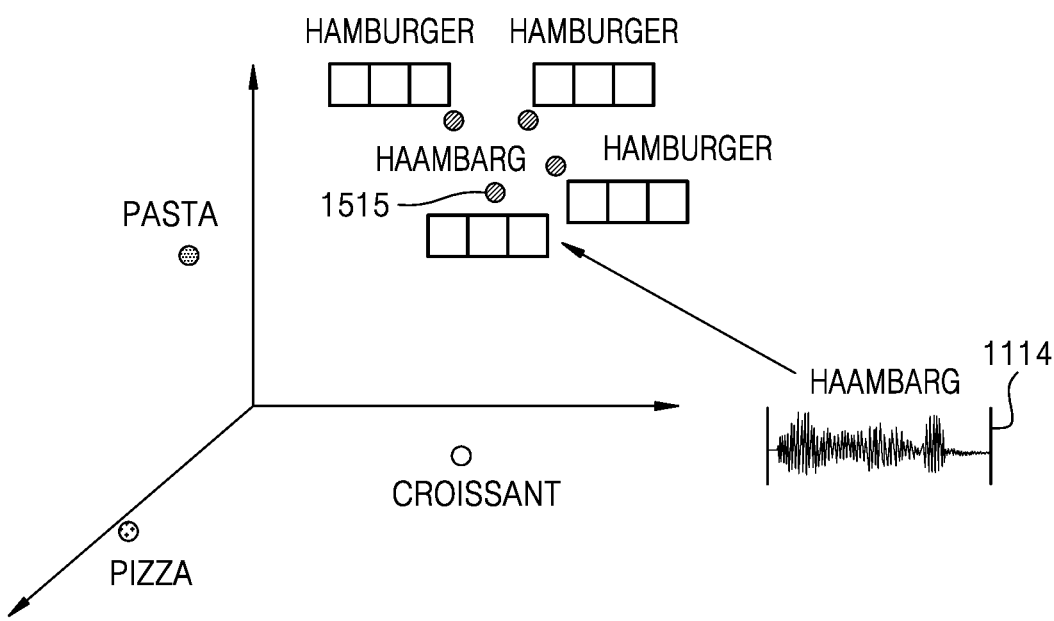

FIGS. 14 and 15 illustrate a method, performed by a device, of storing a new named entity based on a speech signal of a user, according to an embodiment of the disclosure.

Referring to FIG. 14, when a user utters "Find me a haambarg", a speech signal generated by the user utterance 10 may be received. In addition, the device 1000 may determine that "Find me a haambarg" is a sentence represented by the received speech signal. Further, the device 1000 may determine "haambarg" to be a named entity.

The device 1000 may determine "homebrew" to be a corrected named entity, based on a speech signal portion corresponding to "haambarg", and may display the image 115 showing a location of a craft beer specialty store around the user on a map.

In addition, the device 1000 may display a menu for selecting "haambarg", which is an original named entity determined from the speech signal of the user. When the device 1000 receives a user input for selecting "haambarg", the device 1000 may determine "haambarg" to be a new named entity not stored in an acoustic embedding DB, and may search for a store named "haambarg". As a hamburger specialty store named "haambarg" is found, the device 1000 may display the image 140 showing a location of the store name "haambarg" on the map.

In addition, referring to FIG. 15, the device 1000 may store an acoustic embedding vector 1515 of the speech signal portion 1114 corresponding to "haambarg" in the acoustic embedding DB 2033 to correspond to "haambarg".

Accordingly, even when a new named entity not stored in the acoustic embedding DB 2033 occurs, the device 1000 may automatically add the new named entity without a separate operation of retrieving the new named entity and adding the new named entity to the acoustic embedding DB 2033.

Figure 16:
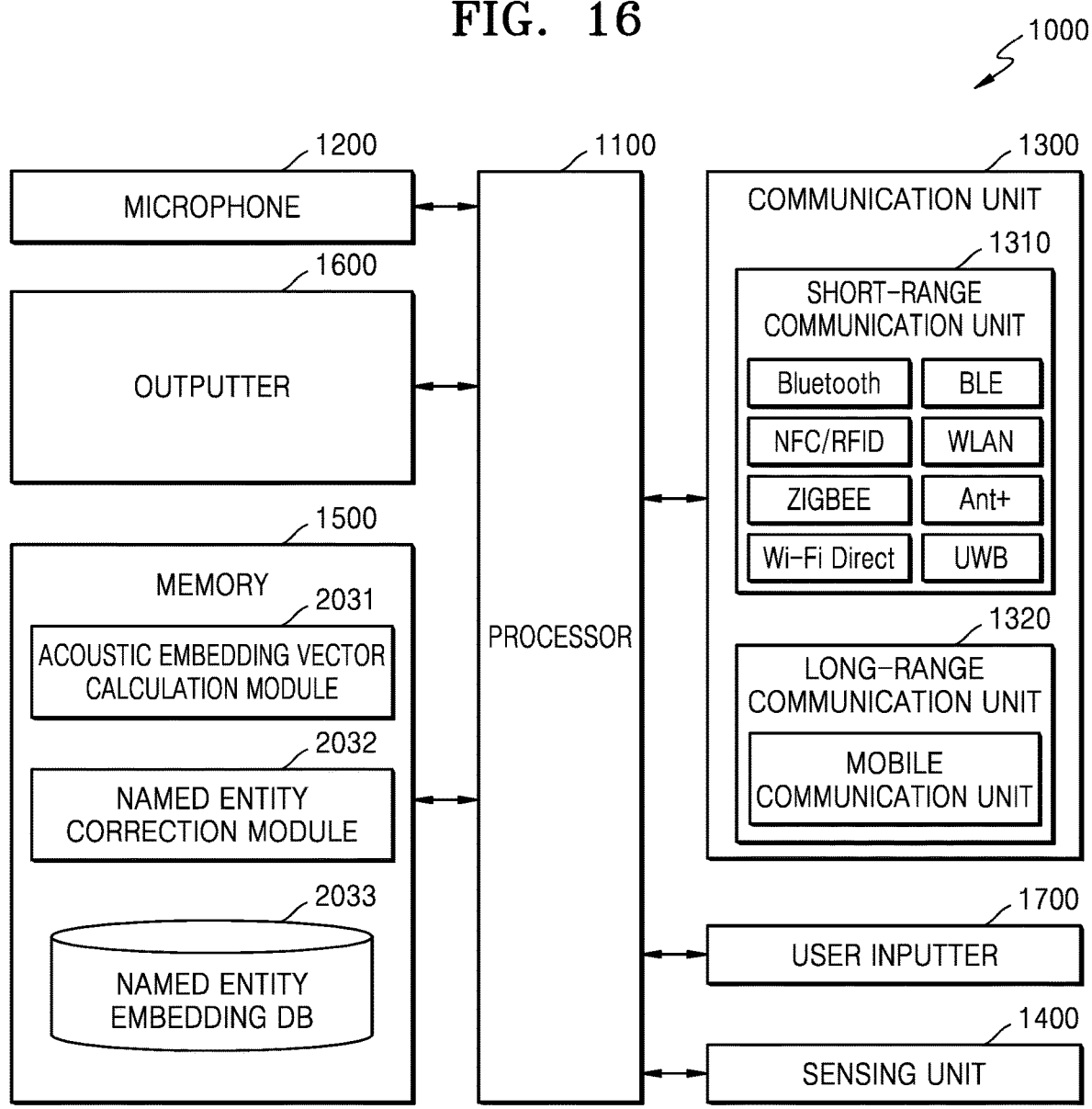
FIG. 16 illustrates a block diagram illustrating functions of a device, according to an embodiment of the disclosure.

FIG. 16 is a block diagram illustrating functions of a device, according to an embodiment of the disclosure.

The device 1000 may include, but is not limited to, one of a mobile device, a wearable device, a household appliance, an artificial intelligence speaker, a personal computer (PC), and a notebook computer. In addition, according to some embodiments of the disclosure, the device 1000 may include one system in which at least two devices are operated to interwork with each other.

Referring to FIG. 16, the device 1000 may include a microphone 1200, a communication unit 1300, a memory 1500, a user inputter 1700, an outputter 1600, a sensing unit 1400, and a processor 1100.

Not all the illustrated components are essential components of the device 1000. The device 1000 may be implemented by more components or less components than the components illustrated in FIG. 16.

The microphone 1200 may receive a sound signal including a speech signal of a user.

The outputter 1600 may include a sound outputter (not shown) and a display (not shown).

The sound outputter (not shown) may output a sound signal to the outside of the device 1000. The sound outputter (not shown) may include, for example, a speaker or a receiver. The speaker may be used for general purposes such as multimedia reproduction or record reproduction.

The display (not shown) may output image data, which is processed by an image processing unit (not shown), via a display panel (not shown), according to control by the processor 1100. The display panel (not shown) may include at least one of a liquid crystal display, a thin film transistor-liquid crystal display, an organic light-emitting diode, a flexible display, a 3-dimensional (3D) display, or an electrophoretic display.

The memory 1500 stores various information, data, instructions, programs, and the like required for operations of the device 1000.

The memory 1500 may include, but is not limited to, the acoustic embedding vector calculation module 2031, the named entity correction module 2032, and the acoustic embedding DB 2033.

According to some embodiments of the disclosure, the memory 1500 may include only the acoustic embedding vector calculation module 2031 and the named entity correction module 2032, and may interwork with a server including the acoustic embedding DB 2033.

In addition, according to some embodiments of the disclosure, when the device 1000 interworks with a server 2000 for performing speech recognition, the memory 1500 may not include the acoustic embedding vector calculation module 2031, the named entity correction module 2032, and the acoustic embedding DB 2033.

The memory 1500 may include at least one of volatile memory or nonvolatile memory, or a combination thereof. The memory 1500 may include at least one of a flash memory type storage medium, a hard disk type storage medium, a multimedia card micro type storage medium, card type memory (for example, SD or XD memory or the like), random access memory (RAM), static random access memory (SRAM), read-only memory (ROM), electrically erasable programmable read-only memory (EEPROM), programmable read-only memory (PROM), magnetic memory, a magnetic disk, or an optical disk. In addition, the device 1000 may operate a web storage or a cloud server, which performs a storage function on Internet.

The user inputter 1700 may receive a user input for controlling the device 1000. The user inputter 1700 receives a user input and transfers the user input to the processor 1100.

The user inputter 1700 may include, but is not limited to, a user input device including a touch panel for sensing touch by a user, a button for receiving a push operation of a user, a wheel for receiving a rotation operation by a user, a keyboard, a dome switch, and the like.

In addition, the user inputter 1700 may include a motion sensor (not shown). For example, the motion sensor (not shown) may sense a motion of the device 1000 and may receive the sensed motion as a user input. In addition, the speech recognition device (not shown) and the motion sensor (not shown), which are described above, may be included in the device 1000, as modules independent of the user inputter 1700, instead of being included in the user inputter 1700.

The communication unit 1300 may transmit information, image signals, or audio signals to or receive information, image signals, or audio signals from a source device (not shown) or an external server in accordance with a protocol, according to control by the processor 1100. The communication unit 1300 may include at least one communication module and at least one port, for transmitting data to and receiving data from an external device (not shown).

In addition, the communication unit 1300 may communicate with the external device via at least one wired or wireless communication network. The communication unit 1300 may include at least one of a short-range communication unit 1310 or a long-range communication unit 1320, or a combination thereof. The communication unit 1300 may include at least one antenna for wirelessly communicating with other devices.

The short-range communication unit 1310 may include at least one communication module (not shown) for performing communication according to communication standards such as Bluetooth, WiFi, Bluetooth Low Energy (BLE), near-field communication (NFC)/radio-frequency identification (RFID), Wifi Direct, ultra-wideband (UWB), or ZIGBEE. In addition, the long-range communication unit 1320 may include a communication module for performing communication via a network for Internet communication. Further, the long-range communication unit 1320 may include a mobile communication unit for performing communication according to communication standards such as $3^{rd}$-generation (3G), $4^{th}$-generation (4G), $5^{th}$-generation (5G), and/or $6^{th}$-generation (6G).

Furthermore, the communication unit 1300 may include a communication module, for example, an infrared (IR) communication module or the like, which may receive a control command from a remote controller (not shown) located at a short distance.

The sensing unit 1400 may include various sensors, for example, an image sensor, an infrared sensor, an ultrasonic sensor, a LiDAR sensor, a human body sensor, a motion sensor, a proximity sensor, an illuminance sensor, and the like. Functions of the respective sensors may be intuitively inferred from the names thereof by those of ordinary skill in the art, and thus, descriptions thereof are omitted.

The processor 1100 controls overall operations of the device 1000. The processor 1100 may control the components of the device 1000 by executing programs stored in the memory 1500.

According to some embodiments of the disclosure, the processor 1100 may include a separate neural processing unit (NPU) for performing operations of a machine learning model. In addition, the processor 1100 may include a central processing unit (CPU), a graphics processing unit (GPU), or the like.

According to some embodiments of the disclosure, the processor 1100 may include a hardware structure (for example, an NPU) specialized for processing of an artificial intelligence model. The artificial intelligence model may be generated through machine learning. Such learning may be performed, for example, in the device 1000 itself in which operations of the artificial intelligence model are performed, or may be performed via a server.

A learning algorithm may include, but is not limited to, for example, supervised learning, unsupervised learning, semi-supervised learning, or reinforcement learning. The artificial intelligence model may include a plurality of artificial neural network layers. An artificial neural network may include, but is not limited to, one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, and a combination of two or more thereof. The artificial intelligence model may additionally or alternatively include a software structure, in addition to the hardware structure.

The processor 1100 may receive a speech signal generated by an utterance of a user, via the microphone 1200.

In addition, the processor 1100 may determine a speech signal portion corresponding to an identified named entity, from the received speech signal, by executing the acoustic embedding vector calculation module 2031; may generate an acoustic embedding vector corresponding to the determined speech signal portion, based on an acoustic embedding model; and may determine one of a plurality of acoustic embedding vectors corresponding to a plurality of named entities included in the acoustic embedding DB 2033, based on distances between the plurality of acoustic embedding vectors and the generated acoustic embedding vector.

Further, the processor 1100 may determine that a named entity corresponding to the determined acoustic embedding vector, from among the plurality of named entities included in the acoustic embedding DB 2033, is a corrected named entity, by executing the named entity correction module 2032.

Furthermore, the processor 1100 may output, via the outputter 1600, a result of speech recognition with respect to the speech signal, based on the corrected named entity.

In addition, the processor 1100 may store the generated embedding vector in the acoustic embedding DB 2033 to correspond to the corrected named entity. Further, the processor 1100 may determine at least one candidate embedding vector, and may display, via a display (not shown), a menu for selecting one of the determined at least one candidate embedding vector, in addition to displaying the result of the speech recognition. Furthermore, the processor 1100 may store the generated embedding vector in the acoustic embedding DB 2033 to correspond to the candidate named entity selected by the user.

In addition, the processor 1100 may display, via the display (not shown), a menu for selecting the identified named entity. When the processor 1100 receives, via the user inputter 1700, a user input for selecting the identified named entity, the processor 1100 may store the generated acoustic embedding vector in the acoustic embedding DB 2033 to correspond to the identified named entity, and may provide the result of the speech recognition with respect to the speech signal, based on the identified named entity.

Figure 17:
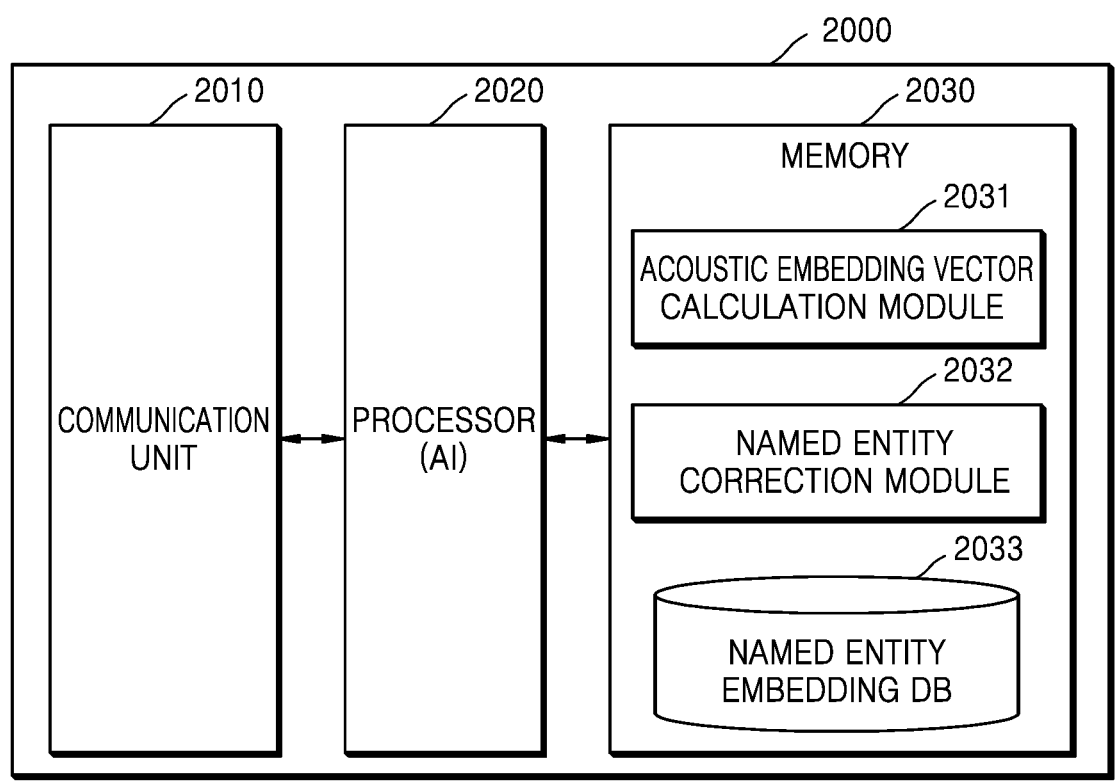
FIG. 17 illustrates a block diagram illustrating functions of a server, according to an embodiment of the disclosure.

FIG. 17 illustrates a block diagram illustrating functions of a server, according to an embodiment of the disclosure.

Referring to FIG. 17, the server 2000 may include a communication unit 2010, a processor 2020, and a memory 2030. However, not all the illustrated components are essential components. The server 2000 may be implemented by more components or less components than the illustrated components.

The communication unit 2010 may include one or more components allowing communication between the server 2000 and the device 1000.

The memory 2030 stores various information, data, instructions, programs, and the like required for operations of the server 2000.

The memory 2030 may include the acoustic embedding vector calculation module 2031, the named entity correction module 2032, and the acoustic embedding DB 2033. In addition, according to some embodiments of the disclosure, the memory 2030 may interwork with another server including the acoustic embedding DB 2033, instead of including the acoustic embedding DB 2033.

The processor 2020 may control overall operations of the server 2000 by using programs or information stored in the memory 2030.

The processor 2020 may include a separate NPU for performing operations of a machine learning model. In addition, the processor 2020 may include a CPU, a GPU, or the like.

According to some embodiments of the disclosure, the processor 2020 may include a hardware structure (for example, an NPU) specialized for processing of an artificial intelligence model. The artificial intelligence model may be generated through machine learning.

The processor 2020 may receive a speech signal generated by an utterance of a user from the device 1000 via the communication unit 2010.

In addition, the processor 2020 may determine a speech signal portion corresponding to an identified named entity, from the received speech signal, by executing the acoustic embedding vector calculation module 2031; may generate an acoustic embedding vector corresponding to the determined speech signal portion, based on an acoustic embedding model; and may determine one of a plurality of acoustic embedding vectors corresponding to a plurality of named entities included in the acoustic embedding DB 2033, based on distances between the plurality of acoustic embedding vectors and the generated acoustic embedding vector.

Further, the processor 2020 may determine that a named entity corresponding to the acoustic embedding vector determined from among the plurality of named entities included in the acoustic embedding DB 2033 is a corrected named entity, by executing the named entity correction module 2032.

In addition, the processor 2020 may transmit a result of speech recognition with respect to the speech signal to the device 1000 via the communication unit 2010, based on the corrected named entity. Further, the processor 2020 may transmit a named entity and an acoustic embedding vector to and receive a named entity and an acoustic embedding vector from the device 1000.

As disclosed herein, embodiments of the disclosure may enable identification of a spoken named identity in a user utterance directly from the speech signal of the user utterance. Further, since the named entity DB may store various pronunciations of a named entity in a plurality of language spheres, one acoustic embedding model may be trained to recognize pronunciations of the named entities, e.g., Chinese pronunciation of a Polish city.

According to an embodiment of the disclosure, the method according to various embodiments disclosed may be provided while included in a computer program product. The computer program product is merchandise and may be traded between a seller and a purchaser. The computer program product may be distributed in the form of a machine-readable storage medium (for example, compact disc read-only memory (CD-ROM)) or may be distributed (for example, downloaded or uploaded) online, through an application store (for example, Samsung Store™) or directly between two user devices (for example, smartphones). For online distribution, at least a portion of the computer program product (for example, a downloadable app) may be at least temporarily stored or be temporarily generated in a machine-readable storage medium, such as a server of a manufacturer, a server of an application store, or a memory of a relay server.

The machine-readable storage medium may be provided in the form of a non-transitory storage medium. Here, the term "non-transitory storage medium" merely means that the storage medium is tangible and does not include signals (for example, electromagnetic waves), whether data is semipermanently or temporarily stored in the storage media or not. For example, the "non-transitory storage medium" may include a buffer in which data is temporarily stored.

The term "module" or "unit (or portion)" used in various embodiments herein may include a unit implemented by hardware, software, or firmware, and may be used interchangeably with a term such as logic, a logic block, a part, or a circuit. The module may be an integrated part or be a minimum unit or portion of the part, which performs one or more functions. For example, according to an embodiment of the disclosure, the module may be implemented in the form of an application-specific integrated circuit (ASIC).

The invention claimed is:

1. A speech recognition method comprising:
receiving a speech signal generated by an utterance of a user;
identifying a named entity from the received speech signal;
determining a speech signal portion, which corresponds to the identified named entity, from the received speech signal;
generating a first acoustic embedding vector corresponding to the speech signal portion, based on an acoustic embedding model;
determining an acoustic embedding vector closet to the first acoustic embedding vector from among a plurality of acoustic embedding vectors corresponding to a plurality of named entities included in an acoustic embedding database (DB), as a second acoustic embedding vector, based on the acoustic embedding model;
determining a corrected named entity corresponding to the second acoustic embedding vector, from among the plurality of named entities included in the acoustic embedding DB;
displaying the corrected named entity and a result of speech recognition with respect to the speech signal, based on the corrected named entity;
determining at least one candidate embedding vector including an acoustic embedding vector second closest to the first acoustic embedding vector and an acoustic embedding vector third closest to the first acoustic embedding vector from among the plurality of acoustic embedding vectors, based on the acoustic embedding model;

displaying at least one candidate named entity corresponding to the at least one candidate embedding vector from among the plurality of named entities included in the acoustic embedding DB; and based on receiving a user input for selecting one of the at least one candidate named entity, displaying a result of the speech recognition corresponding to the selected candidate named entity and storing the first acoustic embedding vector in the acoustic embedding DB to correspond to the selected candidate named entity, wherein the acoustic embedding model is trained using training data, the training data comprising texts representing one or more named entities, respective phoneme labels corresponding to the texts, and one or more speech signals corresponding to utterances of the one or more named entities; and wherein the training comprises:

performing a first training of the acoustic embedding model using the training data including the texts, the respective phoneme labels, and the one or more speech signals; and performing a second training of the acoustic embedding model using a subset of the training data, the subset including the texts and the one or more speech signals.

2. The speech recognition method of claim 1, wherein the determining of the second acoustic embedding vector based on the distances between the plurality of acoustic embedding vectors and the first acoustic embedding vector comprises:

determining the second acoustic embedding vector which is closest in distance to the first acoustic embedding vector, from among the plurality of acoustic embedding vectors.

3. The speech recognition method of claim 1, wherein the acoustic embedding DB includes a named entity corresponding to two or more embedding vectors that are converted from different speech signals.

4. The speech recognition method of claim 3, wherein the different speech signals are speech signals according to pronunciations of the named entity in different linguistic spheres.

5. The speech recognition method of claim 1, wherein the determining of the speech signal portion corresponding to the identified named entity, from the received speech signal, comprises:

identifying time periods of phonemes represented by the received speech signal;

determining a time period corresponding to the identified named entity, based on the identified time periods of the phonemes; and determining a portion of the received speech signal, which corresponds to the time period, to be the speech signal portion corresponding to the identified named entity.

6. The speech recognition method of claim 1, wherein, as the result of the speech recognition, an application providing a content regarding the corrected named entity is executed, and the speech recognition method further comprises:
when a user input for the provided content is received, storing the first acoustic embedding vector in the acoustic embedding DB to correspond to the corrected named entity.

7. The speech recognition method of claim 1, further comprising:

displaying a menu for selecting the named entity identified from the received speech signal, in addition to the result of the speech recognition based on the corrected named entity;

when a user input for selecting the identified named entity is received, storing the first acoustic embedding vector in the acoustic embedding DB to correspond to the identified named entity; and providing the result of the speech recognition with respect to the speech signal, based on the identified named entity.

8. A speech recognition device comprising:

a microphone;

at least one memory storing one or more instructions; and at least one processor configured to execute the one or more instructions to:

receive, via the microphone, a speech signal generated by an utterance of a user;

identify a named entity from the received speech signal;

determine a speech signal portion, which corresponds to the identified named entity, from the received speech signal;

generate a first acoustic embedding vector corresponding to the speech signal portion, based on an acoustic embedding model;

determine an acoustic embedding vector closest to the first acoustic embedding vector from among a plurality of acoustic embedding vectors, corresponding to a plurality of named entities included in an acoustic embedding database (DB), as a second acoustic embedding vector, based on the acoustic embedding model;

determine a corrected named entity, which corresponds to the second acoustic embedding vector, from among the plurality of named entities included in the acoustic embedding DB;

display the corrected named entity and a result of speech recognition with respect to the speech signal, based on the corrected named entity;

display at least one candidate named entity corresponding to the at least one candidate embedding vector from among the plurality of named entities included in the acoustic embedding DB; and based on receiving a user input for selecting one of the at least one candidate named entity, display a result of the speech recognition corresponding to the selected candidate named entity and store the first acoustic embedding vector in the acoustic embedding DB to correspond to the selected candidate named entity, wherein the acoustic embedding model is trained using training data, the training data comprising texts representing one or more named entities, respective phoneme labels corresponding to the texts, and one or more speech signals corresponding to utterances of the one or more named entities; and wherein the training comprises:

performing a first training of the acoustic embedding model using the training data including the texts, the respective phoneme labels, and the one or more speech signals; and performing a second training of the acoustic embedding model using a subset of the training data, the subset including the texts and the one or more speech signals.

9. The speech recognition device of claim 8, wherein the at least one processor is configured to execute the one or more instructions to:

determine, the second acoustic embedding vector which is closest in distance to the first acoustic embedding vector, from among the plurality of acoustic embedding vectors.

10. The speech recognition device of claim 8, wherein the acoustic embedding DB includes a named entity corresponding to two or more embedding vectors that are converted from different speech signals.

11. The speech recognition device of claim 10, wherein the different speech signals are speech signals according to pronunciations of the named entity in different linguistic spheres.

12. The speech recognition device of claim 8, wherein the at least one processor is configured to execute the one or more instructions to determine the speech signal portion, which corresponds to the identified named entity, from the received speech signal by:
   identifying time periods of phonemes represented by the received speech signal;
   determining a time period corresponding to the identified named entity, based on the identified time periods of the phonemes; and
   determining a portion of the received speech signal, which corresponds to the time period, to be the speech signal portion corresponding to the identified named entity.

13. The speech recognition device of claim 8, wherein, as the result of the speech recognition, an application providing a content regarding the corrected named entity is executed, and
   the at least one processor is further configured to execute the one or more instructions to:
   when a user input for the provided content is received, store the first acoustic embedding vector in the acoustic embedding DB to correspond to the corrected named entity.

14. The speech recognition device of claim 8, wherein the at least one processor is further configured to execute the one or more instructions to:
   display a menu for selecting the named entity identified from the received speech signal, in addition to the result of the speech recognition based on the corrected named entity;
   when a user input for selecting the identified named entity is received, store the first acoustic embedding vector in the acoustic embedding DB to correspond to the identified named entity; and
   provide the result of the speech recognition with respect to the speech signal, based on the identified named entity.

* * * * *